United States Patent [19]

Welschof

[11] 4,116,019

[45] Sep. 26, 1978

[54] BEARING ELEMENT SEAL FOR A UNIVERSAL JOINT

[75] Inventor: Hans-Heinrich Welschof, Odenwaldstrasse 26, 6451 Rodenbach 1, Fed. Rep. of Germany

[73] Assignee: Löhr & Bromkamp GmbH, Offenbach am Main, Fed. Rep. of Germany

[21] Appl. No.: 714,232

[22] Filed: Aug. 13, 1976

[30] Foreign Application Priority Data

Aug. 13, 1975 [DE] Fed. Rep. of Germany ....... 2536113

[51] Int. Cl.$^2$ ........................... F16D 3/30; F16D 3/41
[52] U.S. Cl. ..................................... 64/17 A; 64/17 R
[58] Field of Search ................... 64/17 A; 277/82, 205

[56] References Cited

U.S. PATENT DOCUMENTS

| 3,200,615 | 6/1965 | Stokely | 64/17 A |
| 3,204,428 | 9/1965 | Stokely | 64/17 A |
| 3,479,840 | 11/1969 | Meyers | 64/17 A |
| 3,592,022 | 7/1971 | Stokely | 64/17 A |
| 3,906,746 | 9/1975 | Haines | 64/17 A |

FOREIGN PATENT DOCUMENTS 792,291  3/1958  United Kingdom ..................... 64/17 A

*Primary Examiner*—Allan D. Herrmann
*Assistant Examiner*—R. C. Turner
*Attorney, Agent, or Firm*—Edmund M. Jaskiewicz

[57] ABSTRACT

In a universal joint there is provided a sealing ring for sealing relative to a trunion and a bearing element surrounding a trunion pin having roller elements adjacent thereto. The sealing ring has a substantially U-shaped cross-section and one leg is positioned between shoulders formed in the bearing element and trunion pin. A portion of a web is positioned in the annular shoulder in the bearing element and the other leg has a sealing lip engaging the trunion pin. A further portion of the web extends radially inwardly of the bearing element to engage the roller elements and to restrain the roller elements against axial movement.

5 Claims, 4 Drawing Figures

BEARING ELEMENT SEAL FOR A UNIVERSAL JOINT

The present invention relates to a seal for a universal joint, more particularly, to a seal relative to a trunion and a bearing element surrounding a trunion pin having roller elements adjacent thereto.

In a universal joint, it is desirable to provide a seal with respect to the trunion and a bearing element surrounding a trunion pin. Such a seal is generally located in the bore of the bearing element or in a shoulder formed within the bearing element. The sealing element may comprise a sealing lip which engages the outer surface of the trunion pin.

Such seals which have been known to date have the disadvantage that sheet metal rings must be provided to retain the seal in the bearing element and another ring must be mounted on the shoulder of the trunion pin to protect the seal from outside sources of dirt and damage. Such sheet metal components are extremely expensive to fabricate and they also require precise manufacturing tolerances to insure that the seal is precisely positioned axially in the bushing. The sheet metal parts are also necessary to prevent the seal from being dislodged by the pressure of the lubricant in the bearing element.

It is therefore the principal object of the present invention to provide in a universal joint an improved seal which effectively seals the trunion bearings regardless of manufacturing tolerances.

It is another object of the present invention to provide a labyrinth seal for sealing between the trunion of a universal joint and a bearing element surrounding the trunion pin which is simple in structure and reliable in function.

It is a further object of the present invention to provide such a seal which requires no special provisions or structure for retaining the seal in proper operating position with respect to the bushing.

According to one aspect of the present invention there may be provided a device for sealing relative to the trunion of a universal joint and a bearing element surrounding a trunion pin having roller bearings adjacent thereto comprising a sealing ring. The sealing ring is of a substantially U-shaped cross-section and has first and second legs interconnected by a web. The first leg and a portion of the web is supported between shoulders on the bearing element and trunion pin positioned within the annular shoulder in the bearing element. A second leg has a sealing lip which engages the trunion pin. The web has a further portion which restrains the roller elements against axial movement.

The sealing ring of the present invention has the advantage that a labyrinth seal can now be applied to deep drawn bushings or bearing elements in which an external shoulder could not be formed. The seal is protected against damage from the exterior of the universal joint even during initial assembly and no sheet metal components are required for retaining the seal in position. The leg portion of the seal which engages the bore of the bearing element functions simultaneously to support the seal in position and to create a chamber outwardly of the trunion pin which prevents coarse foreign particles from entering to the interior of the bearing. The inner sealing lip is constantly lubricated by the lubricant which is retained between this lip and the outer leg so that the bearing is protected against the possibility of running dry. Further, the lubricant cushion protects the bearing against the penetration of moisture into the interior of the bearing element. At the same time, the sealing ring supports the roller elements of the bearing in position. The particular shape or configuration of this sealing ring is advantageous in that it may be readily manufactured by molding which permits the use of relatively hard wearing materials such as polyethylene, polyamide and polyurethane.

Other objects and advantages of the present invention will be apparent upon reference to the accompanying description when taken in conjunction with the following drawings, which are exemplary, wherein.

Proceeding next to the drawing wherein like reference symbols indicate the same parts throughout the various views a specific embodiment and modifications of the present invention will be described in detail.

Figure 1:
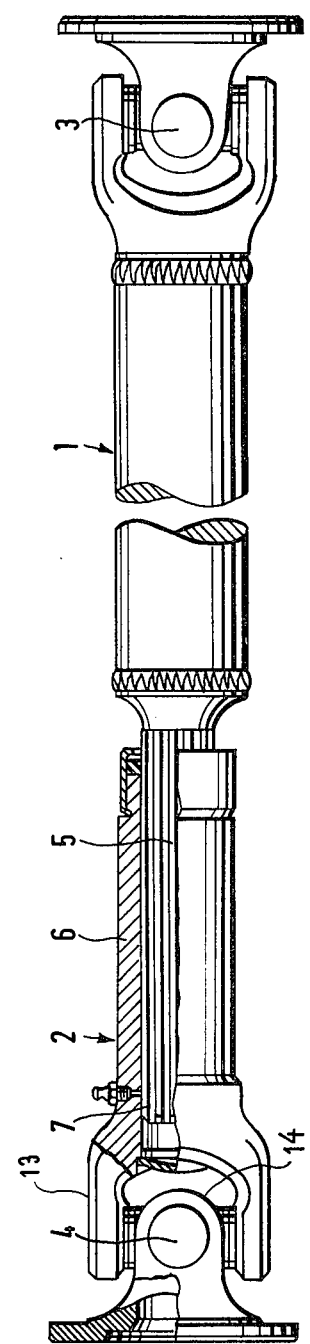
FIG. 1 is an elevational view of a drive shaft having universal joints at each end thereof with a portion of the shaft being shown in sections.

The drive or power transmission shaft illustrated in FIG. 1 comprises two co-axial portions 1 and 2 having universal joints 3 and 4 at their outer ends. The inner end of shaft portion 1 comprises a solid shaft 5 which is inserted into a tubular portion 6 of the shaft portion 2. The solid shaft 5 and the hollow shaft 6 are connected by V-shaped splines 7 so as to be non-rotatable with respect to each other but are capable of slidable axial displacement.

Figure 2:
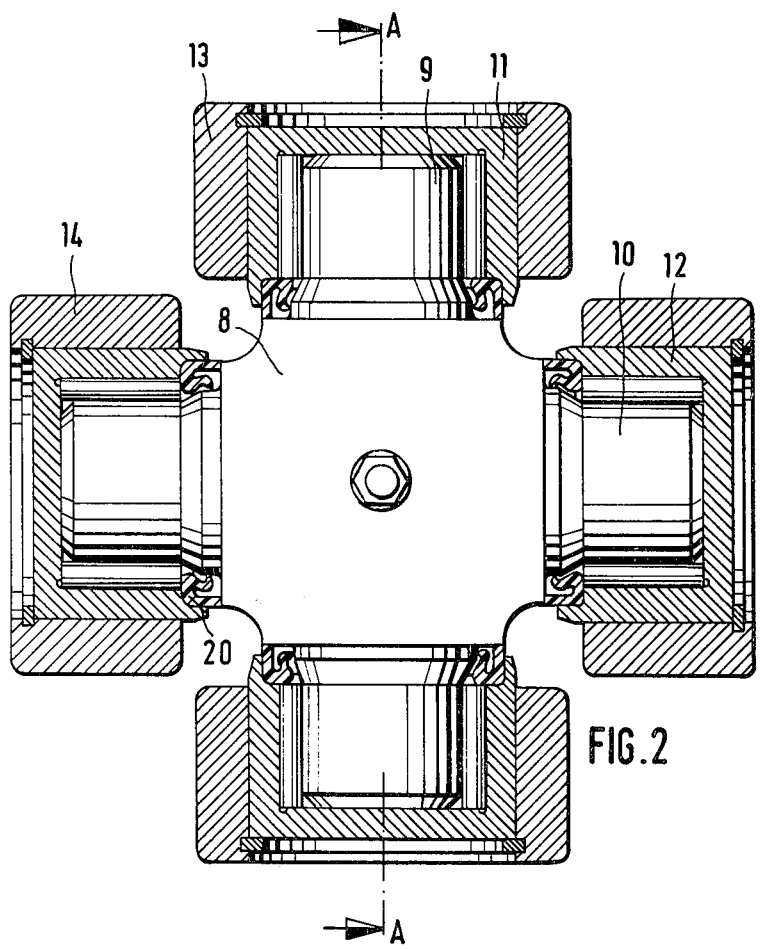
FIG. 2 is a transverse sectional view through a universal joint in the plane of the trunion pins.
Figure 3:
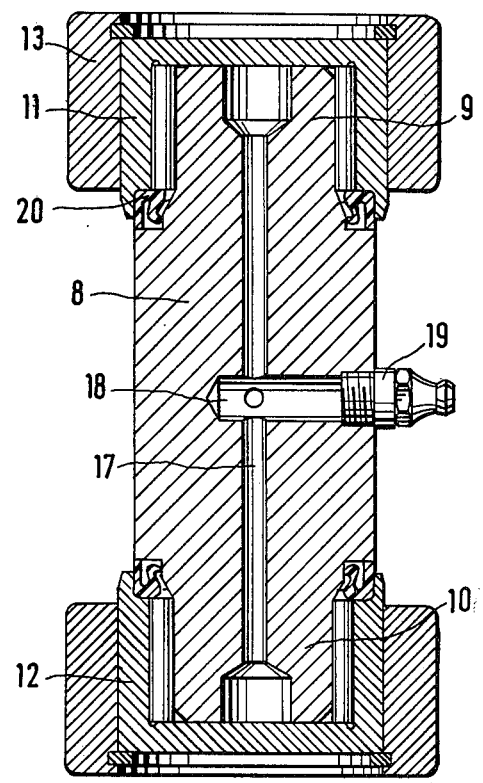
FIG. 3 is a sectional view taken along the line A—A of FIG. 2.

The universal joint, such as the universal joints 3 and 4 of FIG. 1, is shown in FIGS. 2 and 3 and comprises a cross-shaped trunion body 8, which may be a forging, having four trunion pins 9 and 10 around which are positioned bearing elements 11 and 12. These bearing elements are received in bores formed in yoke arms 13 and 14

Within the trunion 8 are bores 17 which extend through the trunion pins 9 and 10 and intersect in a central cavity 18 which is closed by a suitable lubricant fitting 19. Sealing rings 20 are provided at the inner ends of each of the bearing elements 11 and 12 as may be seen in FIG. 3. These sealing rings will permit any excess lubricant supplied during lubrication to escape to the exterior of the universal joint but will prevent any dirt or water from entering into the bearing cavity within the bearing element.

Figure 4:
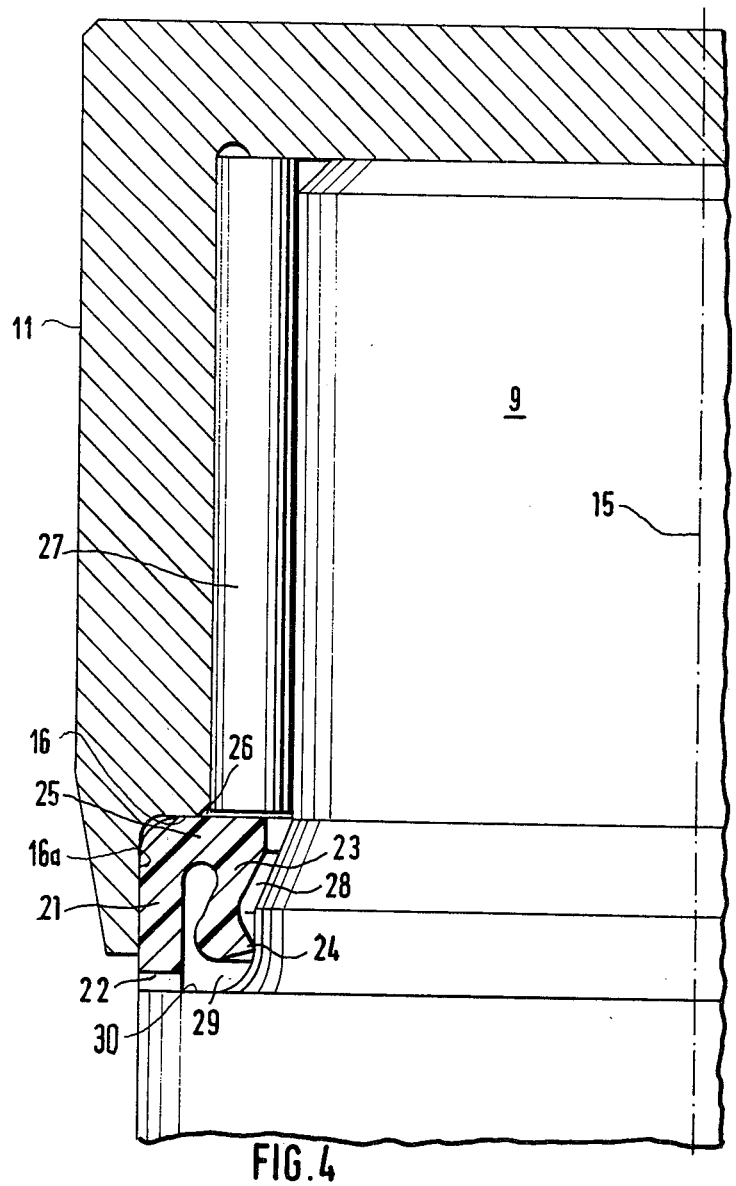
FIG. 4 is an axial sectional view of a trunion pin in enlarged scale and showing the roller elements, bearing element and sealing ring of the present invention.

The sealing ring 20 is shown in greater detail in FIG. 4 and comprises a substantially U-shaped member having legs 21 and 23 interconnected by a web 25. The leg 21 and a portion of the web 25 are positioned within an annular shoulder 16 formed by a bore in the inner end of the bearing element 11. There is an axial bore surface 16a against which the leg 21 is supported and a portion of outer face 26 of the web 25 is supported against the radial surface of the shoulder 16. The lower end of the leg 21 is supported against an annular shoulder 30 or radial surface formed in the trunion pin. A plurality of openings 22 in the form of apertures or recesses are formed in the end of the leg 21 adjacent annular shoulder 30. The outer surface 26 of the sealing ring 20 also extends radially inwardly of the bearing element 11 and engages the ends of roller elements 27 which are positioned around the trunion pin 9. The roller elements 27 are thus supported axially by the web portion of the sealing ring 20.

The end of the leg 23 of the sealing ring 20 is provided with a sealing lip 24 which is in engagement with the peripheral surface of the trunion pin. The sealing lip 24 divides the interior of the bearing into two lubricant chambers 28 and 29. The lubricant in these two chambers prevents the sealing lip from running dry since the sealing lip is continuously surrounded by lubricant. Any water or foreign particles which may have penetrated from the outside will collect in the outer chamber 29 and cannot enter into the interior 28 of the bearing.

The sealing ring 20 is secured or fitted into the annular shoulder 16 of the bearing element 11 as a simple push-in fit. As a result, the sealing ring 20 is protected during transportation of the joint and prior to assembly. During the lubricating or greasing process, the lubricant which may move past the roller elements 27 into the chamber 28 is pushed past the sealing lip 24 into the outer chamber 29 from which excess lubricant may escape to the exterior of the joint through the openings 22. After the escape of any excess lubricant the sealing lip 24 will resiliently return back to its former position in contact with the surface of the trunion pins.

The apertures 22 thus prevent any build-up of unduly high pressures within the bearing when a lubricant is introduced into the bearing. These permanently open apertures 22 and the low resistance to pressure at the lip 24 from lubricant emerging from the chamber 28 will prevent a potential build-up of internal pressure within the bearing which would impart additional stress for the universal joint as a whole. In addition, the apertures provide a visual control over the lubrication process to insure that all of the trunion pins are adequately and uniformly provided with lubricant.

It will be understood that this invention is susceptible to modification in order to adapt it to different usages and conditions, and accordingly, it is desired to comprehend such modifications within this invention as may fall within the scope of appended claims.

What is claimed is:

1. A device for sealing relative to a trunion of a universal joint and a bearing element surrounding a trunnion pin having roller bearings adjacent thereto, and comprising a sealing ring of substantially U-shaped cross-section having first and second legs interconnected by a web, said sealing ring consisting of a resilient material, there being a first annular shoulder on a bearing element and a second annular shoulder on a trunnion pin, said sealing ring first leg supported between said shoulders to position the sealing ring axially, said second leg having a sealing lip resiliently engaging the trunnion pin such that any excess lubricant can flow from the roller elements to the exterior of the joint, said web positioned within said first shoulder and having a portion engageable with the roller elements to restrain said roller elements against axial movement.

2. A device as claimed in claim 1 wherein said first annular shoulder has an axial surface and a radial surface, said ring first leg being supported along said axial surface and said web being supported along said radial surface.

3. A device as claimed in claim 1 wherein said web portion extends radially inwardly with respect to the bearing element to engage the roller elements.

4. A device as claimed in claim 1 wherein said first leg has a plurality of openings therein.

5. A device as claimed in claim 4 wherein said openings are at the end of said first leg adjacent said second annular shoulder.

* * * * *